United States Patent [19]

Kawai

[11] 4,092,066
[45] May 30, 1978

[54] PROJECTION DEVICE FOR USE IN COPYING MACHINE

[75] Inventor: Yoshihisa Kawai, Aichi, Japan

[73] Assignee: Minolta Camera Kabushiki Kaisha, Japan

[21] Appl. No.: 825,458

[22] Filed: Aug. 17, 1977

[30] Foreign Application Priority Data

Aug. 25, 1976 Japan .............................. 51-101844
Aug. 19, 1976 Japan ........................ 51-111478[U]

[51] Int. Cl.² ..................... G03B 27/54; G03B 27/48
[52] U.S. Cl. ......................................... 355/67; 355/51
[58] Field of Search ................................ 355/48–51, 355/67, 71, 47, 57, 52, 55, 56, 60, 66, 8, 11

[56] References Cited

U.S. PATENT DOCUMENTS 3,510,218  5/1970  Limberger et al. .................... 355/51
3,741,646  6/1973  Knechtel et al. ...................... 355/50

Primary Examiner—Donald A. Griffin
Attorney, Agent, or Firm—Wenderoth, Lind & Ponack

[57] ABSTRACT

The copying machine employed with the projection device of the present disclosure is designed for copying a thin document which is moved directly over a transparent support, and a thick document which is moved over the transparent support through a suitable transparent plate. The projection device includes a light source for projecting light rays emitted from the light source onto the document to be copied through a first optical path formed between the light source and the document. The light rays reflected from the document are transmitted, through a second optical path formed between the document and photoreceptor, towards the photoreceptor surface. The projection device further includes a transparent correcton plate pivotally provided to move between a first position where the correction plate intrudes into the first optical path and a second position where the correction plate intrudes into the second optical path so as to correct the optical length, and to correct the intensity and distribution of the light to be projected onto the photoreceptor.

5 Claims, 9 Drawing Figures

PROJECTION DEVICE FOR USE IN COPYING MACHINE

BACKGROUND OF THE INVENTION

The present invention relates to copying machine, and more particularly, to an improvement of a projection device employed therein for projecting light emitted from a light source onto a document to be copied.

In the field of photocopying, it is considered convenient to provide a dual-purpose photocopying machine which may produce photocopies both of thin original documents, for example in the form of a single sheet of paper, and of thick original documents, for example in the form of a page of a book, in order to avoid the expense and space requirements of separate photocopying machines exclusive for thin or thick original documents. When a thick original document, for example, a page of a book is to be copied, the reverse side of the document is protected from external light by other pages of the book, etc., with which the document being copied is combined, while the document is held in position for photocopying by the weight of such other pages, etc. On the other hand, when a thin original document is copied, it is necessary to employ means for positioning and holding the original document in the required manner and also to protect the original document from external light, in order to avoid excessive illumination of the document during photocopying thereof.

In a photocopying machine in which an original document is moved during the photocopying process, there is employed, for example, a rotatable drum having a peripheral layer which is made of photosensitive material, and successive portions of which are exposed to image-wise light reflected from successive portions of the original document brought to an illumination station where the document is successively illuminated. The light rays reflected from the document are directed onto the photosensitive drum through a focusing lens or similar means, as the drum rotates and document is moved to form an electrostatic latent image of the document on the photosensitive peripheral layer of the drum. After the image of the original document has been transferred onto a transfer material, for example, a copy paper sheet, the copy paper is processed in a known manner and forwarded to be discharged out of the photocopying machine. In dual-purpose photocopying machine employing such means, during photocopying of a thin original document, the document is moved past the illumination station slidingly over a transparent support, while gripped between driving rolls and pressing rolls, in which the pressing rolls are provided on the inner side of a movable opaque cover which is normally positioned over the illumination station. When a thick original document is to be copied, the opaque cover is removed, and the original document is supported on a transparent carrier plate which rides on and is moved by the driving rolls to bring successive portions of the original document into alignment with the illumination station.

In the electrophotocopying machine as described above, an optical system for projecting the image of the original document onto the photosensitive layer is normally so arranged as to have the image of the document placed directly over the transparent support sharply focus on the photosensitive surface. Accordingly, the document presented in a form of sheet of paper and placed directly on the transparent support can be sharply focused on the photosensitive surface, whereas the image of the document presented in a form of book and placed on the transparent carrier plate will be out of focus due to difference of length of the optical path, which difference is caused by the thickness of the transparent carrier plate. More specifically, when the refractive index of the material of the transparent carrier plate is designated as $n_1$, and the thickness thereof as $d_1$, the length of the optical path from the surface of the document in the form of book to the focusing lens or similar means is $d_1/n_1$ longer than the length of the optical path from the surface of the document in the form of sheet of paper to the focusing lens.

In the conventional type of electrophotographic copying machines, the arrangement as described above results in a disadvantage that the focusing means of the projection means can only be set to obtain optimum sharpness of images in copying either thin original documents or thick original documents, but not both and, therefore, it has not been possible to obtain equal resolution in copying of all types of documents.

In order to overcome such disadvantages, there have been proposed various methods such as employment of a lens assembly having a long focal length so as to increase the depth of field through which focus may be achieved. However, it has been found that the employment of such a lens assembly does not ensure satisfactory resolution in photocopies of all types of documents. In addition, such employment of such a lens assembly resulted in another disadvantage that the optical system must be made larger if a lens having a long focal length is included therein.

Another method which is disclosed, for example, in U.S. Pat. No. 3,510,218 of W. Limberger et al. is to provide another transporting path for transporting the thin original documents in addition to the transporting path for transporting the thick original document, the former being arranged at a position higher than the latter by a length corresponding to the thickness of the transparent carrier plate, or a further method which is disclosed in U.S. Pat. No. 3,741,646 of Knechtel et al. is to provide a transparent carrier plate for copying thin original documents similar to the transparent carrier plate provided for copying thick original documents, so that in either method, the focal length of the optical path in relation to the thin original documents and thick original documents is the same, while such arrangements as described above often require a large space for employing additional members and result in high manufacturing cost.

A still further method is disclosed in U.S. Patent Application Ser. No. 740,722 of Ogawa et al. assigned to the same applicant, in which it is explained that the difference of the optical path length caused by the thickness of the transparent carrier plate is eliminated by placing a transparent block having a predetermined refraction index between the illumination station and focusing means.

However, in addition to such disadvantages as previously explained, the presentation of the transparent carrier plate results in a decrease of light intensity of the light rays reflected from the document presented in the form of book since a certain portion of light rays are absorbed or reflected by the transparent carrier plate, thus resulting in a difference in the condition of copied papers between those copied with and without the transparent carrier plate.

It is accordingly, a primary object of the present invention to provide a projection device for use in electrophotographic copying machine which is designed to directly transmit a thin original document and a thick original document, where the thick original document is placed over a carrier member, said projection device including correction means for correcting the changes of the light of the optical path and the amount of exposure on the photoreceptor caused by the presence of the carrier member.

It is another object of the present invention to provide a projection device of the above described type which is provided with a ventilation system for cooling the various elements provided in the projection device so as to avoid an undesirable heating of the projection device caused by the employment of the correction means.

It is a further object of the present invention to provide a projection device of the above described type which is compact in size accurate in functioning and can be produced at low manufacturing cost.

SUMMARY OF THE INVENTION

In order to accomplish these and other objects according to the present invention, the projection device comprises a light source and various reflectors for projecting light rays emitted from the light source onto the document to be copied through a first optical path formed between the light source and the document. The light rays reflected from the document are transmitted, through a second optical path formed between the document and the photoreceptor, towards the photosensitive or photoreceptor surface. The projection device further includes a transparent correction plate member pivotally provided to move between a first position, in which the correction plate intrudes into the first optical path, and a second position, in which the correction plate enters the second optical path. In the case where the correction plate intrudes into the first optical path, a thin document such as sheet of paper is placed at the illumination station. The positioning of the correction plate in the first optical path makes it possible to reduce the light rays to be projected onto the document, while the lens assembly provided in the second optical path is so arranged as to form a maximum sharpness of the image of the document on the photoreceptor surface. On the other hand, in the case where the correction plate enters the second optical path, a thick document such as book may be placed at the illumination station over the transparent carrier plate. The positioning of the correction plate in the second optical path makes it possible to correct the optical distance of the second optical path to be substantially equal to that of the first path provided with the transparent carrier plate since the refractive index of the correction plate is larger than that of air. Furthermore, the absence of the correction plate in the first optical path makes it possible to increase the intensity of the light rays to be projected onto the document.

Although the employment of such a correction plate may cause an accumation of undesirable heat in the projection device, such heat can be advantageously removed by a ventilation system provided in the projection device. The places where the various elements for the ventilation system are provided are previously selected to be such places where the light rays emitted from the light source are not utilized for projecting the document. Accordingly, the ventilation system provided in the projection device will not form any obstruction in the optical path.

These and other objects and features of the present invention will become apparent from the following descriptions taken in conjunction with preferred embodiments thereof with reference to the accompanying drawings, in which;

DETAILED DESCRIPTION OF THE INVENTION

Before the description of the present invention proceeds, it is to be noted that like parts ae designated by like reference numerals throughout the accompanying drawings.

Figure 1:
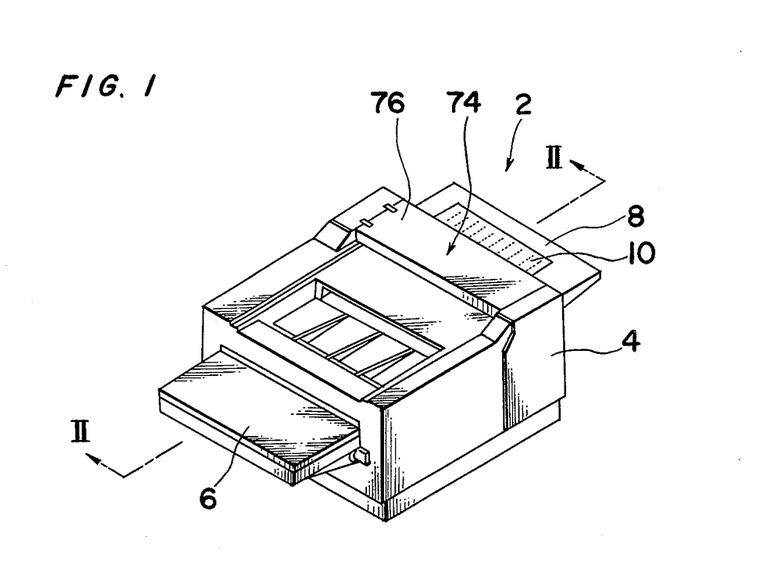
FIG. 1 is a perspective view of a photocopying machine equipped with a projection device of the present invention.

Referring first to FIG. 1, there is shown a perspective view of an electrostatic latent image transfer type copying machine to which a projection device of the present invention may be applied. The electrophotographic copying machine 2 comprises a housing 4, a copy paper supplying case 6 installed at one end of the housing 4, a platform 8 on the upper side of the housing 4 for placing thereon an original document 10 to be copied. The document 10 to be copied may be either in a form of a thin material such as a sheet of paper or a thick material such as book, requiring a simple rearrangement of the projection device 50 which is described in detail later. In the meantime, however, further structure of the copying machine as well as the function thereof is given hereinbelow.

Figure 2:
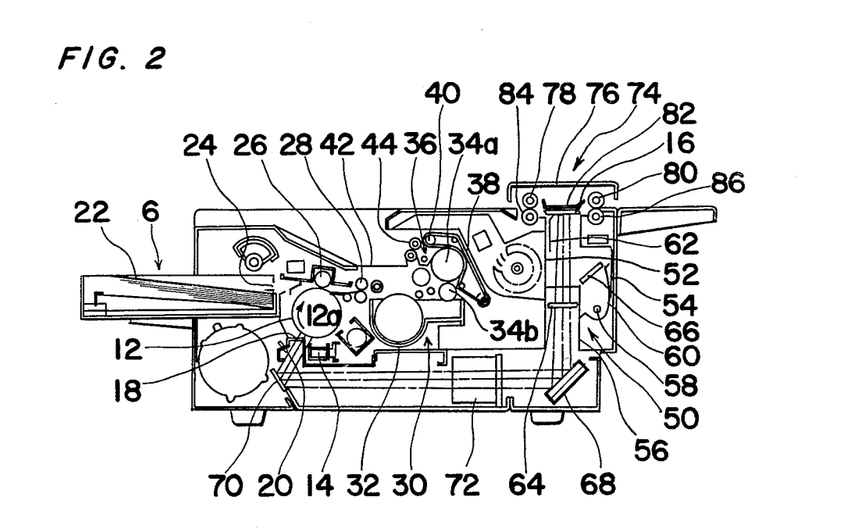
FIG. 2 is a cross sectional view of the photocopying machine taken along the line II—II of FIG. 1.

Referring also to FIG. 2, the copying machine 2 accommodates therein an optical system at the right-hand side and at the bottom side, when viewed in FIG. 2, and a processing system at the upper side thereof. Since the electrophotographic processing system and the method performed thereby are well known to those skilled in the art, the various operating elements thereof will be described in terms of their functions.

The electrophotographic copying system comprises a photoreceptor surface, generally indicated by a reference numeral 12, including a photoconductive layer or light receiving layer on a conductive backing and formed in the shape of drum 12a, which is mounted on a shaft (not shown) journaled in a machine frame (not shown) to rotate in the direction indicated by the arrow to cause the drum surface 12 sequentially to pass a plurality of processing stations including charging, exposure or image forming, transfer and erasing stations.

The charging station includes a corona charger 14 which applies a uniform electrostatic charge on the photoreceptor surface 12. Positioned next to and adjacent the charging station respect to the direction of rotation of the photoreceptor surface 12 is the exposure or imaging station at which rays of light carrying an image of the document 10 to be copied, which have been transmitted from an illuminating station where the document 10 subsequently moves past a transparent support 16, as will be described later, via an exposure slit 18 formed by a slit mechanism 20, in the form of a ribbon of light, are projected onto the photoreceptor surface 12 to dissipate the electrostatic charge in the exposed area thereof, thereby forming a latent electrostatic image of the original to be copied.

In the left-hand side of the photoreceptor 12, there is provided a paper feeding station including a paper feeding mechanism adapted to feed copy sheets of recording medium, for example, copy paper, successively to the photoreceptor surface 12 in coordination with the presentation of the developed image at said paper feeding station. This paper feeding mechanism comprises the paper supplying case 6 where a plurality of sheets of copy paper 22 are enclosed therein for successively discharging a sheet of copy paper during each copying operation, through a discharging opening 24 formed at the right-hand side of the casing 6.

At the transfer station, there is provided a transfer roll 26 having its curved surface pressed against the photoreceptor surface 12 for effecting transfer of the electrostatic latent image on the photoreceptor surface further onto the sheet of copy paper when the sheet of copy paper is fed between the photoreceptor surface 12 and the transfer roll 26.

The sheet of copy paper, that has been transferred with electrostatic latent image from the photoreceptor surface 12 at the transfer station, is thereafter removed from the photoreceptor surface 12 by a pick-off mechanism (not shown) and forwarded by a pair of juxtaposed forwarding rolls 28 towards a developing device 30 of the wet developing type, mainly comprising a developing tank 32 containing developing solution of toner in liquid state, in which developing device 30 the latent image on the copy paper sheet is developed into a visible image. Positioned adjacent the exit of the tank 32 are juxtaposed squeezing rolls 34a and 34b, provided to squeeze out the developing solution from the copy sheet which has passed through the developing device 30.

The copy paper sheet coming out from the juxtaposed squeezing rolls 34a and 34b is fed into a fixing device 36 comprising absorbent belts 38 movably supported by supporting rolls 40 while one portion of the belts 38 is extended along the surface of the squeezing roll 34a. The wet copy paper sheet is inserted between the surface of the absorbent belts 38 and the squeezing roll 34a for being dried and for fixing the visible image thereon, thereafter the copy paper sheet is peeled off from the surface of the squeezing roll 34a by a separation claw (not shown), then fed out of the copying machine on a copy tray 42 through juxtaposed discharging rolls 44 provided between the fixing device 36 and the copy tray 42.

Figure 3:
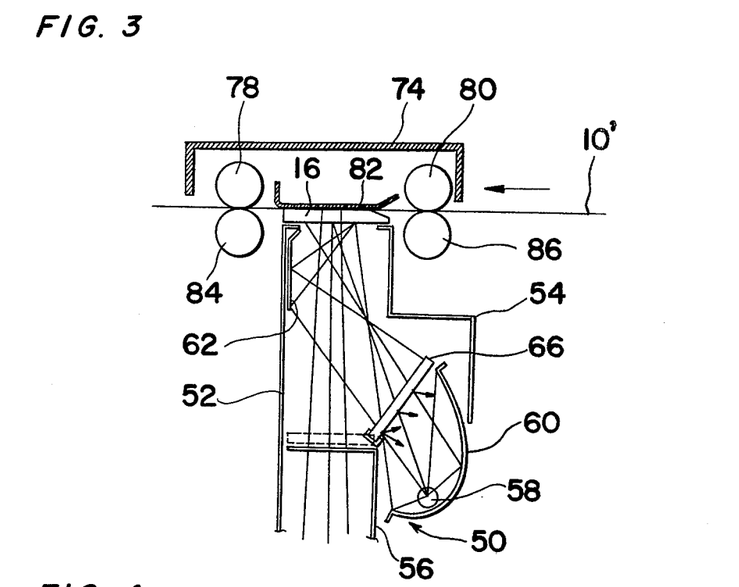
FIG. 3 is a fragmentary view of the projection device of the present invention showing positioning of a correction plate for copying a thin original document.
Figure 4:
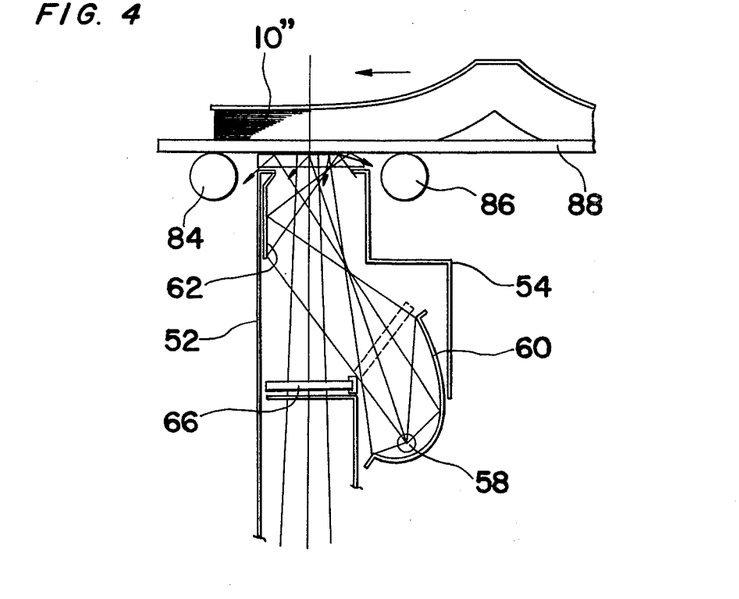
FIG. 4 is a view similar to FIG. 3, but particularly showing positioning of the correction plate for copying a thick original document.

Still referring to FIG. 2, and further to FIGS. 3 and 4, the optical system of the electrophotographic copying machine, which is substantially accommodated within the bottom side and right-hand side of the housing 4, comprises the projection device 50 of the present invention which is particularly provided under the transparent support 16 and in a space defined between opposite light sealing walls 52 and 54, and between the opposite side walls (not shown) of the housing 4. The space, particularly at the bottom side thereof, is divided into two portions by a partition wall 56 provided between the sealing walls 52 and 54. The projection device 50 includes a source of light or lamp 58 and an elliptical or oval shaped reflector 60 which are installed in the space on the right-hand side of the partition wall 56, namely the right-hand side space, for projecting light rays emitted from the light source 58 into the document 10 on the transparent support 16 through a first optical path defined between the light source 58 and the document 10 in the shape of a ribbon of light to sequentially illuminate the document 10 over the entire width thereof and a subsidiary reflector 62 provided below the transparent support 16 for eliminating undesirable shadows caused by the light source 58.

The projection device 50 further comprises a transparent correction plate 66 having its one end pivotally connected to an upper end of the partition wall 56 and capable of moving between a first position which is illustrated in real lines and a second position which is illustrated in phantom lines.

Provided directly below the transparent support 16 is a first reflective mirror arrangement 68, through a dust-proof glass 64, for reflecting the ribbon of light from the document 10 towards a second reflective mirror arrangement 70 provided at the bottom side of the housing 4. The ribbon of light which is reflected from the second reflective mirror arrangement 70 is projected onto the photoreceptor surface 12 at the exposure station. The focusing of the ribbon of light projected onto the photoreceptor surface 12 is effected by a lens assembly 72 which is fixedly provided between the first and the second reflective mirror arrangements 68 and 70.

It is to be noted that the ribbon of light reflected from the document 10 travels through a second optical path defined between the document 10 and the photoreceptor surface 12.

Provided directly above the transparent support 16 is an opaque cover 74 comprising a frame 76 hingedly connected to the edge of the housing 4 (FIG. 1), a pair of pressing rolls 78 and 80 rotatably journaled onto the frame 76 and a top plate 82 fixedly supported by the frame 76. When the cover 74 is moved to a place where it is located exactly on top of the projection device 50, the rolls 78 and 80 are opposed to and in parallel relation with driving rolls 84 and 86, respectively, while the top plate 82 is opposed to the transparent support 16, as shown in FIG. 2.

When it is necessary to carry out the copying operation in the case where the document 10 is a comparatively thin material, such as a sheet of paper 10' as shown in FIG. 3, the cover 74 is placed exactly on top of the projection device 50 so that the sheet of paper 10' is transmitted between the driving rolls 84 and 86 and pressing rolls 78 and 80 and also between the top plate 82 and the transparent support 16 in a direction indicated by an arrow (FIG. 3).

On the other hand, when it is necessary to carry out the copying operation where the document 10 is a comparatively thick material, such as a book 10" as shown in FIG. 4, the cover 74 is moved away from the top of the projection device 50, and instead, a carrier plate 88 made of transparent material such as glass or acrylic resin is placed over the projection device 50, i.e., over the driving rolls 84 and 86, while the book 10" is further placed on top of the transparent carrier plate 88. Since the transparent plate 88 is supported by the driving rolls 84 and 86, rotation of the same rolls 84 and 86 move the book 10" together with the transparent carrier plate 88 in the direction indicated by an arrow (FIG. 4). Since the further structure and function of the opaque cover 74 is described in U.S. Pat. No. 3,510,218 of W. Limberger et al., a detailed description thereof is omitted for brevity.

The description hereinbelow is particularly directed to the projection device 50 directly related to the present invention.

Referring particularly to FIG. 3, the projection device 50 shown therein is arranged to effect the copying operation in the case where the document is presented in the form of sheet of a paper. In this first case wherein the document is a sheet of paper, the transparent correction plate 66 is moved to the first position so as to cause the plate 66 to intrude into the first optical path in a predetermined angular relation thereto, thus decreasing the intensity of the light to be projected onto the document 10', by the effect of reflection and absorption of the light passing through the correction plate 66. Furthermore, the correction plate 66 in this first position is out of the second optical path so that the ribbon of light reflected from the document 10' and transmitted through the second optical path will not be any influenced by the correction plate 66. Accordingly, when the correction plate 66 is in the first position, the light to be projected onto the document 10' is adjusted to have a predetermined intensity while the optical distance of the second optical path is arranged to have a predetermined length whereat the image of the document 10' sharply focuses on the photoreceptor surface 12.

Referring now particularly to FIG. 4, the projection device 50 shown therein is arranged to effect the copying operation when the document is presented in the form of book 10". In this second case for the document in the book form, the transparent correction plate 66 is moved to the second position so as to cause the plate 66 to intrude into the second optical path in an approximately right angle relation, thus increasing the intensity of the light to be projected onto the document 10" with respect to the light intensity obtained in the first case. Here, the amount of increase in the light intensity is determined by the degree of reflection and absorption of light in the correction plate 66 when it is placed in the first position. When the correction plate 66 is in the first position, as described before, the intensity of the light rays is reduced by the absorption and reflection of light by the correction plate 66 for projecting the image of the document 10' with a predetermined amount of light intensity.

On the other hand, when the correction plate 66 is moved to the second position, the amount of light rays, directed from the light source 58 to the document 10", is reduced by the absorption and reflection of light at the transparent plate 88. Furthermore, the light rays reflected from the document 10" are reduced by the absorption and reflection of light at the transparent plate 88 and correction plate 66, and in turn, the light is is projected onto the photoreceptor surface 12 through the lens assembly 72.

Accordingly, the degree of reduction of light, obtained during the presence of the correction plate 66 in the first position by the absorption and reflection at the correction plate 66 is approximately equal to the degree of reduction of light obtained during the presence of the correction plate 66 in the second position by the absorption and reflection at the transparent plate 88 and the correction plate 66.

Such equalization of degree of reduction of light causes the light projected onto the photoreceptor surface 12 to be constant, regardless of type of the document, i.e., thick document of a thin document.

It is to be noted that the degree of reduction of light, obtained during the presence of the correction plate 66 in the first position, may be suitably adjusted by a change of inclination of the correction plate 66.

Furthermore, in this second case wherein the document is a book 10", the presence of the transparent plate 88 undesirably increases the length of the second optical path, i.e., the distance between the surface of the book 10" and the photoreceptor surface 12, which is caused by the thickness $d_1$ of the transparent plate 88. Such increase in the distance is corrected by the intrusion of the correction plate 66 into the optical path, since the refractive index of the correction plate 66 is higher than that of the air.

More particularly, when the transparent plate 88 is present on top of the projection device 50, the difference of the optical length L of the second optical path can be given in the following equation;

$$L = \frac{d_1}{n_1} \quad (1)$$

wherein $d_1$ is the thickness of the transparent plate 88, and $n_1$ is the refractive index of the transparent plate 88. In order to correct the difference of the optical length L, the thickness $d_2$ of the correction plate 66 can be given in the following equation;

$$d_2 = \frac{n_2}{n_2 - 1} \cdot \frac{d_1}{n_1} \quad (2)$$

wherein $n_2$ is the refractive index of the correction plate 66. Accordingly, notwithstanding the difference of the actual length in the second optical path between the above described two cases, the optical length is corrected to have exactly the same optical distance. Therefore, the image of the book, as well as that of the sheet of paper, is sharply focused on the photoreceptor surface 12.

Figure 5:
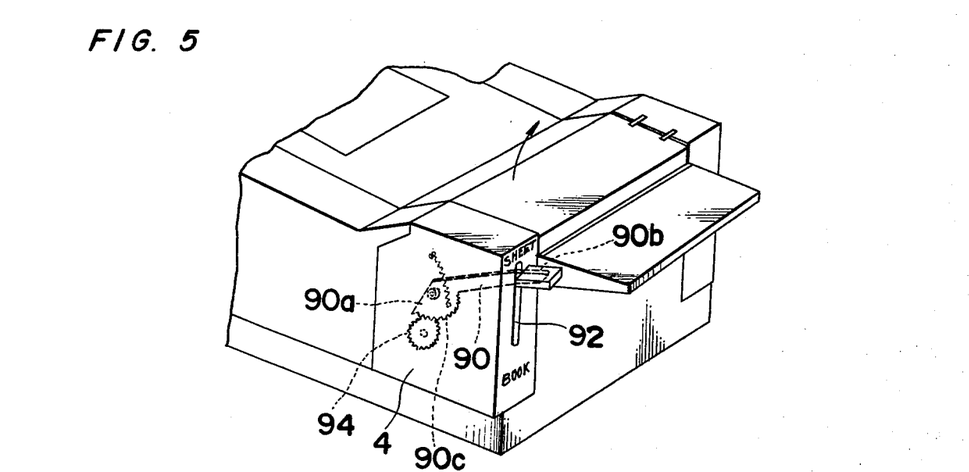
FIG. 5 is a fragmentary perspective end view of the photocopying machine particularly showing one embodiment of means for changing the positioning of the correction plate.
Figure 6:
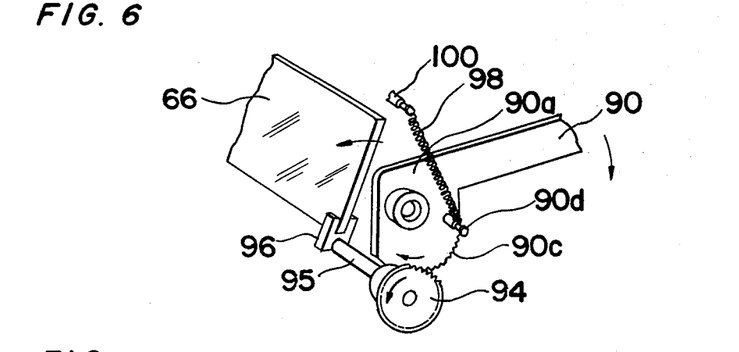
FIG. 6 is an enlarged detail view of the changing means showing a mechanism therefor.

Referring to FIGS. 5 and 6, there is shown a mechanism for moving the transparent correction plate 66 between the first and second positions. The mechanism comprises a lever 90 having one end portion 90a pivotally connected to a pin projection (not shown) provided on the inner surface of the housing 4 and the other end portion projecting outwardly from the housing 4 through an elongated slit 92 formed at the end surface of the housing 4. The one end portion 90a of the lever 90 is formed with a sector shaped gear portion 90c which engages with a corresponding gear 94 fixedly supported on a shaft 95 (FIG. 6). The shaft 95 has one end rotatably supported by an inner surface of the housing 4, while the other end is provided with a U-shaped carrier member 96 which rotates with respect to the rotation of the shaft 95. The transparent correction plate 66 has one edge thereof tightly held by the U-shaped carrier member 96, while the other edge thereof is fixedly supported by another shaft (not shown) which is in alignment with the shaft 95. Accordingly, the transparent correction plate 66 is turned to the first position when the lever 90 is lifted along the elongated slit 92 up to a position indicated as SHEET, while on the other hand, the transparent correction plate 66 is turned to the second position when the lever 90 is manually pressed down along the elongated slit 92 to a position indicated as BOOK. For ensuring the positioning of the lever 90, the lever 90 is provided with a coil spring 98 extending between a pin projection 90d formed at the end portion of the lever 90 and a pin projection 100 fixedly provided on the inner surface of the housing 4 for urging the lever 90 into the respective positions, i.e., upwardly and downwardly moved positions.

Accordingly to such construction of the projection device 50 as described above, the image of the thick original document has a brightness and sharpness substantially equal to that of the thin original document.

Figure 7:
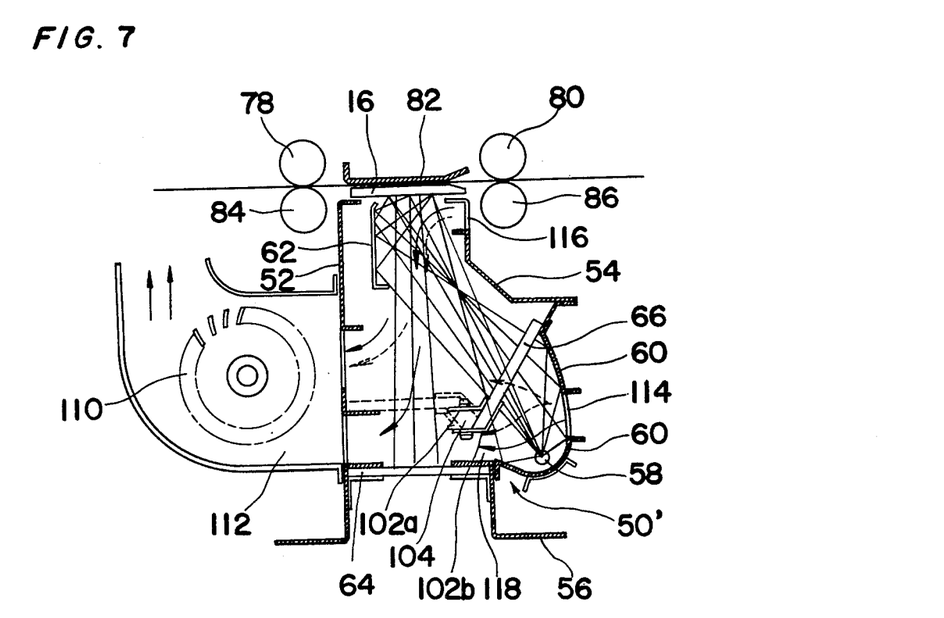
FIG. 7 is a view similar to FIG. 3, but particularly showing another embodiment in which a ventilation system and slit mechanism are employed therein.

Referring to FIG. 7, there is shown a projection device 50' which is another embodiment of the projection device of the present invention. The projection device 50' includes a ventilation system which will be described later; however in the meantime, the construction of the projection device 50' is described hereinbelow.

Figure 8:
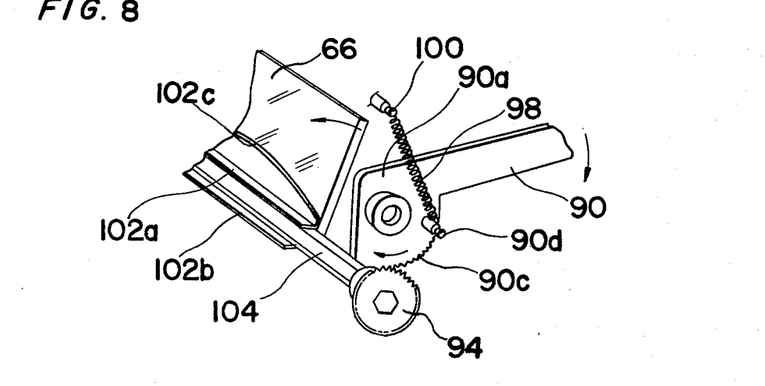
FIG. 8 is a view similar to FIG. 6, but particularly showing a mechanism thereof.

Referring to FIG. 8, the correction plate 66 in this embodiment is held, along one edge portion thereof, by a pair of supporting bar members 102a and 102b each having an L-shaped cross sectional configuration and being fixedly provided on a shaft 104 extending in a direction corresponding to the length of the previously mentioned shaft 94. When the correction plate 66 is rotated to the first position, the other edge portion thereof engages with the edge of the reflector 60. At least one L-shaped bar member, for example, bar member 102b has one elongated plate portion supporting the transparent correction plate 66 formed with a curved edge 102c for forming the slit mechanism between the curved edge 102c and the edge of the reflector 60.

According to the projection device 50' of this embodiment, the reduction of the light, described in the previous embodiment as obtained during the presence of the correction plate 66 in the first position by the absorption and reflection at the correction plate 66, may be obtained by the presence of the supporting bar members 102a and/or 102b which may partly project into the first optical path. More particularly, when the correction plate 66 is brought to the first position, the supporting bar members 102a and/or 102b project into the first optical path for partly blocking the light rays emitted from the light source 58 to reduce the light rays which reach the document, while on the other hand, when the correction plate 66 is turned to the second position, the supporting bar members 102a and 102b do not project into the second optical path. Accordingly, when the correction path 66 is in the second position, the light rays which reach the document are increased, in relation to those light rays reaching the document when the correction path 66 is in the first position, by the amount of light rays obstructed by the supporting bar members 102a and/or 102b. However, such increased amount of light rays is lost in the transparent carrier plate 88 by the absorption and reflection thereat, so that the amount of light rays reaching the documents, i.e., a thin document or a thick document, substantially remains the same.

In other words, the amount of light rays lost in the first optical path during the presence of correction plate 66 in the first position is so arranged as to be equal to the amount of light rays lost due to the presence of the carrier plate 88.

Furthermore, since the supporting bar members 102a and 102b are in alignment with the longitudinal direction of the correction plate 66, it is possible to adjust the amount of light rays to be obstructed by a change of degree of projection of the supporting bar members, while the amount of light rays to be obstructed may be varied along the longitudinal direction of the supporting bar members. For example, when it is desired to have the light rays at the center of the ribbon of light reduced the most, the supporting bar member can be shaped in such a manner that the degree of projection is greatest at the center of the supporting bar members and is reduced towards the opposite ends, as partly shown in FIG. 8.

It is to be noted that the edge 102c may be changed to any suitable shape so as to accomplish a desirable distribution of light in the width-wise direction of the ribbon of light with respect to different types of light sources.

It is also to be noted that the enclosure of the reflector 60 as shown in FIG. 7 prevents the transparent support 16 which is covered by the frame 76 during a thin document copying operation, from being disadvantageously heated by the convection of heat. During the thick document copying operation, the frame 76 is removed from the top of the projection device so that heat will not be undesirably accumulated in the projection device. The heat accumulated in the space defined by the transparent correction plate 66 and the elliptical shaped reflector 60, during the presence of the transparent correction plate 66 in the first position, and, the heat enclosed in the projection device, during the presence of the transparent correction plate 66 in the second position, can advantageously be evacuated by the ventilation system.

Referring back to FIG. 7, the ventilation system comprises a fan 110 provided in a duct 112 which is formed on the left-hand side of the light sealing wall 52 for effecting suction of the air in the projection device 50, which air is introduced into the projection device 50 through several openings formed in the walls of the projection device 50. A first opening 114 is formed in the elliptical shaped reflector 60 and a second opening 116 is formed in the light sealing wall 54 in the portion adjacent the transparent support 16. The positioning for forming those openings 114 and 116, as well as the duct 112, is described hereinbelow.

Figure 9:
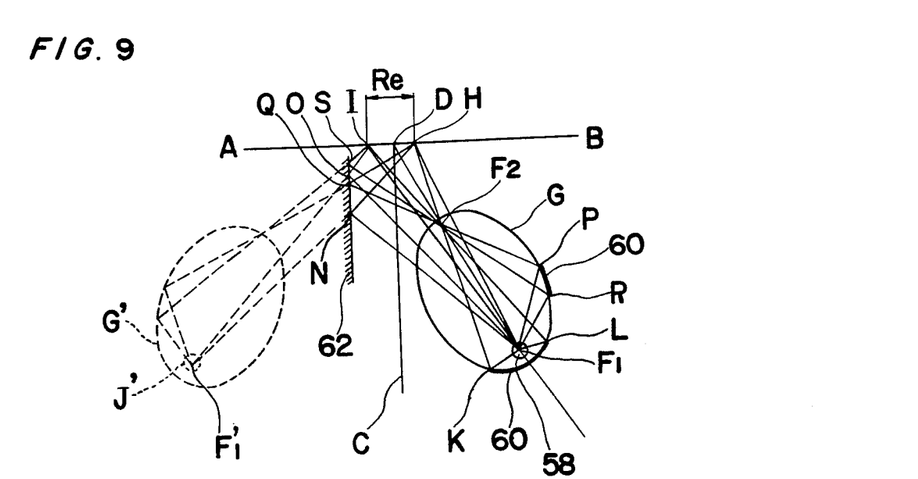
FIG. 9 is a diagrammatic view showing details of the path of the light rays emitted from the light source.

Referring to FIG. 9, the light source 58 schematically shown therein is located at a first focusing point $F_1$ which is determined by the curvature of the elliptical reflector. The line AB shows the surface on which the document moves, and within the line AB, a region Re shows the width of the transparent support where the document is illuminated. A line C perpendicularly extended from the center D of the region Re is in alignment with the optical axis of the second optical path. Although the light rays emitted from the light source are radiated in all directions therearound, the light rays which reach the region Re are limited in certain sections which are given by the angles taken around the center of the light source, i.e., around the first focusing point $F_1$. The first section is given by an angle $\angle IF_1H$ in which the light rays emitted from the light source directly reach the region Re. The second section is given by an angle ∠NF₁O in which the light rays emitted from the light source are first projected onto the subsidiary reflector 62 and then onto the section Re. The third region is given by an angle ∠KF₁L in which the light rays emitted from the light source are first projected onto the elliptical shaped reflector 60 and then onto the region Re through a second focusing point F₂ of the elliptical reflector. The fourth section is given by an angle ∠RF₁P in which the light rays emitted from the light source are first projected onto the elliptical shaped reflector 60 and further onto the subsidiary reflector 62 and then onto the region Re. Accordingly, the light rays emitted in the remaining angles, i.e., ∠IF₁O, ∠NF₁K, ∠LF₁R and ∠PF₁H, will not be utilized for illuminating the region Re.

Within these remaining angles, the first opening 114 is formed in the angles ∠LF₁R, while the duct 118 is formed in the angle ∠NF₁K, so that the light radiated form the light source 58 in these angles will not result in undesirable heating up of the projection device 50'. A further opening may be formed, if necessary, in the wall corresponding with other remaining angles.

Referring again to FIG. 7, when the transparent correction plate 66 is in the first position, part of the air is introduced into the projection device 50 through the first opening 114 towards the duct 112 through an air path formed between the elliptical shaped reflector 60 and the correction plate 66 and further through an opening 118 formed in the partition wall in a portion adjacent the shaft 104 so as to cool the light source 58. Simultaneously, part of the air is introduced into the projection device 50 through the second opening 116 towards the duct 112 through an air path formed by the light sealing wall 54, the transparent support 16, the subsidiary reflector 62 and the transparent correction plate 66 so as to cool the transparent support 16. In order to guide the air in the required direction for cooling a particular member such as transparent support 16, fins, such as fins 120a and 120b, may preferably be provided adjacent the opening 116, or adjacent the opening 114. In this case where the correction plate 66 is turned to the first position, the flow of the air is represented by arrows in real lines.

When the transparent correction plate 66 is moved to the second position, part of the air is introduced into the projection device 50 through the first opening and part through the second opening in a similar manner so that described above so as to move towards the duct 112. In this case where the correction plate 66 is turned to the second position, the flow of the air is represented by the arrows shown in dotted lines.

It is to be noted that the correction plate 66 may be formed by a heat absorbent material for reducing the heat transmitted to the transparent support 16.

It is also to be noted that the width (measured in a direction corresponding to the movement of the document) of the transparent support 16 may be further narrowed, and furthermore, the transparent support 16 may be replaced by a supporting frame member (not shown) having an elongated opening formed therein.

Although the present invention has been fully described by way of examples with reference to the attached drawings, it is to be noted that various changes and modifications will be apparent to those skilled in the art. Therefore, unless otherwise such changes and modifications depart from the scope of the invention, they should be construed as being included therein.

What is claimed is:

1. In a photocopying machine capable of copying an original document of a type selected from either one of a thin original document and a thick original document depending on necessity, in which the original document is moved past an exposure station by transport means during an electrophotographic copying process when the original document is a thin one, and said thick original document is carried on a transparent carrier member moving past said exposure station during an electrophotographic copying process when the original document is a thick one, said thick original document being spaced from said exposure station by a distance equal to the thickness of said transparent carrier member, a projection device comprising;

a light source including reflector means for emitting light rays along a first optical path and for illuminating an original document moving past said exposure station, said light rays reflected from the original document being transmitted along a second optical path towards a projection station where a latent image of the original document is formed; and a transparent plate member having a predetermined thickness and movable between a first position where the transparent plate member intrudes into said first optical path when said thin original is placed over said exposure station and a second position where the transparent plate member intrudes into said second optical path when said thick original is placed over said exposure station on said transparent carrier member a predetermined amount of light rays being absorbed and refected by said transparent plate member when said transparent plate member is positioned in said first position so as to approximately equalize the intensity of the light projected onto said projection station which is absorbed and reflected by said transparent plate member and transparent carrier member when said transparent plate member is positioned in said second position, the difference in the lengths of the optical path from the exposure station to the projection station caused by said thickness of the transparent carrier member being compensated by the refraction index of said transparent plate member, whereby the projected image of the thick original document on said projection station has brightness and sharpness substantially equal to that of the thin original document.

2. A projection device as defined in claim 1, wherein said transparent plate member has a thickness $d_2$ obtained by the following equation;

$$d_2 = \frac{n_2}{n_2 - 1} \cdot \frac{d_1}{n_1}$$

wherein $d_1$ is the thickness of the transparent carrier member and $n_1$ and $n_2$ are refraction indices of the transparent carrier member and the transparent plate member, respectively.

3. A projection device as defined in claim 1, wherein said transparent plate member is provided with a slit member for reducing and equalizing, when said transparent plate member is positioned in said first position, intensity of the light rays projecting onto said thin original document.

4. A projection device as defined in claim 1, wherein said transparent plate member is hingedly supported to a shaft positioned between said first and second optical path to move between said first and second positions.

5. A projection device as defined in claim 4, wherein said transparent plate member is provided with a gear member fixedly provided on said shaft and a lever member having one end portion engaged with said gear member and the other end portion capable of receiving an external force thereon and the intermediate portion being rotatably supported, whereby said transparent plate member moves between said first and second positions upon receipt of said external force.

* * * * *

UNITED STATES PATENT AND TRADEMARK OFFICE
CERTIFICATE OF CORRECTION

PATENT NO. : 4,092,066
DATED : May 30, 1978
INVENTOR(S) : YOSHIHISA KAWAI

It is certified that error appears in the above-identified patent and that said Letters Patent are hereby corrected as shown below:

In the heading: item [30] for Japanese Patent Application Number read --51-101874--.

Signed and Sealed this

Fourteenth Day of November 1978

[SEAL]

Attest:

RUTH C. MASON
Attesting Officer

DONALD W. BANNER
Commissioner of Patents and Trademarks